Aug. 27, 1935.  L. L. MACK  2,012,670

POSTAGE METER

Filed July 16, 1930  9 Sheets-Sheet 2

INVENTOR.

Aug. 27, 1935.  L. L. MACK  2,012,670

POSTAGE METER

Filed July 16, 1930  9 Sheets-Sheet 5

INVENTOR.

Aug. 27, 1935.  L. L. MACK  2,012,670
POSTAGE METER
Filed July 16, 1930  9 Sheets-Sheet 6

Fig. 6

INVENTOR.

Aug. 27, 1935.  L. L. MACK  2,012,670
POSTAGE METER
Filed July 16, 1930   9 Sheets—Sheet 7

INVENTOR.

Aug. 27, 1935.  L. L. MACK  2,012,670
POSTAGE METER
Filed July 16, 1930   9 Sheets-Sheet 8.

INVENTOR.

Aug. 27, 1935.  L. L. MACK  2,012,670
POSTAGE METER
Filed July 16, 1930  9 Sheets-Sheet 9

INVENTOR.

Patented Aug. 27, 1935

2,012,670

UNITED STATES PATENT OFFICE 2,012,670

POSTAGE METER

Luther L. Mack, South Pasadena, Calif., assignor to U. S. Postal Meter Corporation, a corporation of Delaware Application July 16, 1930, Serial No. 468,420

16 Claims. (Cl. 101—91)

This invention relates in general to postage meters whereby authorized indicia in lieu of stamps affixed may be applied to different classes of mail matter by means of a mechanism adapted to be set by postal officials to imprint a predetermined number of impressions or a predetermined value in postage indicia, and which will automatically lock when the amount of prepaid postage or the number of prepaid impressions have been exhausted.

More particularly, this invention relates to and has for a principal object the provision of what may be denominated as a multiple stamp postage meter, whereby a plurality of stamp impressions of different denominations may be selectively imprinted upon mail matter and the values of each impression made registered in the machine, as in other types of single stamp postage meter.

An object is to provide a light weight, simple, durable and effective mechanism which is capable of being sealed and locked against unauthorized access to the printing and registering means, together with certain automatic features which provide safeguards against tampering with the mechanism, and other desirable structural features which will be hereinafter explained in detail.

I have shown a preferred form of the invention in the accompanying drawings, in which.

Figure 2:
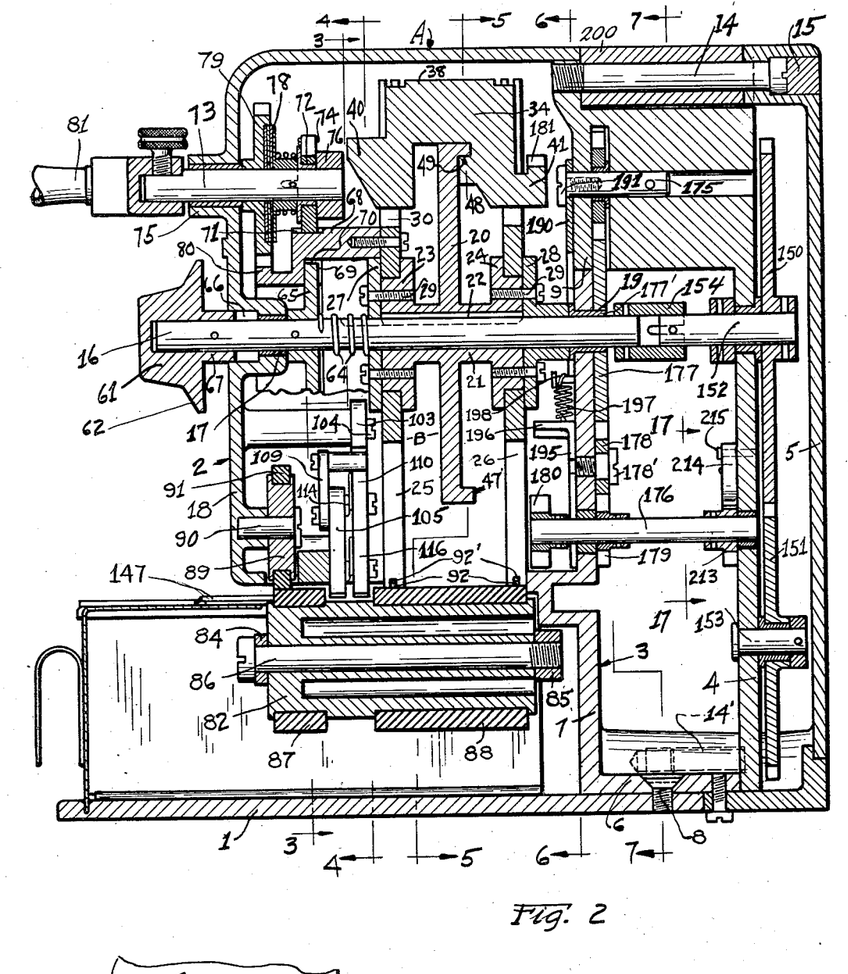
Fig. 2 is a transverse sectional elevation of the same on line 2—2 of Fig. 1.

As illustrated in Fig. 2, my improved mechanism is mounted on and within a suitable housing A, having a flat base 1 and a circular portion 2 mounted on but spaced upwardly from the base 1 and adapted to enclose the principal operating means. A pair of spaced detachable frame members 3 and 4 are provided at the rear of the housing A and are suitably attached thereto, while a back member 5 is also provided rearwardly of the frame member 4 and cooperates with the housing A for enclosing all of the mechanism necessary to prevent access to the operating parts. The member 3 has a wall 7 which extends upwardly from the base to a point above the bottom of the circular portion 2 and forms a closure in that portion of the frame below said circular portion. Said member 3 has a foot 6 which overlies the base 1 and may be attached to the base by means of one or more screws 8, having their heads internally of the housing so as to prevent removal of the screws.

The member 3 is overlapped and engaged by a depending offset portion 9 of member 4 which, extending inwardly of the machine and being provided with cross members or portions 199 as hereinafter mentioned, forms a housing for the registering mechanism, also disclosed hereinafter. The member 4 is attached to the housing A by a pair of bolts or screws 10 which are affixed in lugs or bosses 11—11 formed on or attached to the housing A. (See Figs. 7 and 8.) The ribs 3', 3' of the member 3 are attached to member 4 by means of screws 12, 12 which are affixed in bosses 13, 13 of the member 3. The back 5 is attached by means of a bolt 14 which is affixed in a boss 14a formed on or attached to the member 4. The head of the bolt 14 is counter-sunk in the member 5 and sealed against access by means of a metal plug 15. The member 5 is attached additionally, to the member 3, by means of a pair of bolts or screws 14'—14' which are affixed in bosses provided near the bottom of the member 3, thereby securing the member 4 rigidly between the member 3 and the back 5. The screws 14'—14' are also countersunk and sealed against access in the same manner as the bolt 14.

The portion 2 of the housing A encloses a printing cylinder B which is supported on a central transverse shaft 16 journaled in a bearing 17 formed in the front wall 18 of the housing, and also in a bearing 19 in the wall 7 of member 3. The cylinder B is provided internally thereof with a crowned cam 20 having a hub 21 which is fixed to the shaft 16 by means of a key 22 and has similar flanges 23 and 24 formed on opposite sides of said cam. A pair of discs 25 and 26 forming the ends for the cylinder B are mounted on the flanges 23 and 24 respectively, and are held in position by means of plates 27 and 28, which are attached to the flanges 23 and 24 by means of screws or bolts, as at 29.

The discs so mounted that they may be rotated relative to the cam for purposes hereinafter explained, and are of corresponding diameter and circular in form. Said discs are provided with radial slots 30, 31, 32 and 33 which are alined longitudinally of the cylinder. The cylinder B has a plurality of stamp printing dies 34, 35, 36 and 37 (four being shown), which are radially slidable on the discs 25 and 26 into and from operative position.

Said dies are in all respects similar except as to the denomination of stamp shown on the printing faces 38 thereof, which vary according to the requirements for each machine, and are provided with central body portions slidable between the discs 25 and 26, and lateral extensions 40 and 41 oppositely formed and extended thru the slots 30, 31, 32 or 33, as the case may be, of each of said discs. Thus the slots in the discs provide guideways for extending and retracting the printing dies to and from operative position.

Figure 5:
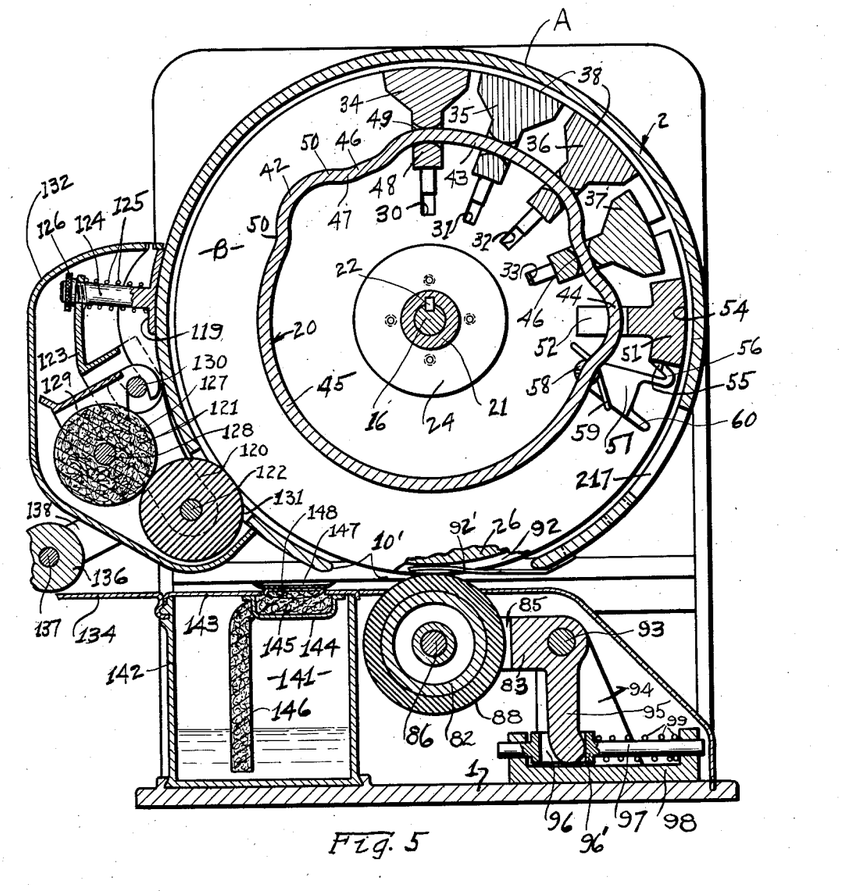
Fig. 5 is a section on line 5—5 of Fig. 2.

The cam 20 is provided with a plurality of "rises" 42, 43 and 44, so positioned at angles with respect to each other that one or the other of said portions will engage and extend one or more of the printing dies into operative position when the cam is rotated relative to the printing dies. Referring to Fig 5, it will be observed that the central "rise" 43 has a substantially longer dwell than the portions 42 or 44, and said portion 43 is concentric with the axis of shaft 16 but of greater radius than the major concentric portion 45 and the other intermediate portions 46 of the cam. The portion 43, therefore, is in itself capable of engagement with one, two or three of the printing dies selectively, and when so engaged will slide the printing die or dies outwardly so that their faces 38 will register with the printing circle.

As seen in Fig. 5, for instance, the portion 43 has been operated to extend the dies 34, 35 and 36 into operative position.

It will be quite obvious that the adjustment of the cam relative to the printing dies for one point in its range of adjusting (assuming that the cam has twelve points of adjustment) will disengage the portion 43 from the die 34 and will engage the die 37, thus extending the dies 35, 36 and 37 simultaneously for operation. A further movement to the right, as seen in Fig. 5, will disengage the portion 43 from die 35, while the dies 36 and 37 remain engaged therewith. Simultaneously with this latter movement of the cam, however, the portion 42 will engage and extend die 34 so that in this adjustment the dies 34, 36 and 37 would be operatively extended. A further movement of the cam in the same direction would effect the engagement only of dies 35 and 37. A still further movement in the same direction would effect the extension only of die 36.

Referring again to the position of the cam as shown in Fig. 5, when the cam is adjusted to the left from the position shown, the die 36 will be disengaged by the portion 43, while the die 37 will be engaged by the portion 44. Thus under such conditions the dies 34, 35 and 37 will be operatively extended. Still further movement of the cam one point to the left will engage the die 36 with the portion 44 and said die is operable thereby even though it is disengaged from portion 43, while the die 34 will be still engaged by the portion 43, whereby dies 34 and 36 are operated. Thus, in such case the cam will have moved two points to the left; one point to disengage portion 43 from die 36, and the next point to engage portion 44 with said die. A further movement of the cam one point to the left will engage die 35 with the portion 44, and said die will be the only one in such case extended for use.

Thus, assuming that the dies 34, 35, 36 and 37 in order represent, as indicated on the drawings, values of postage impressions in the denominations of 5¢, 3¢, 2¢ and 1¢, the following possible combinations may be obtained for imprinting the denominations shown in the table below:

|  | Cents |  | Cents |
|---|---|---|---|
| Die 34 | 5 | Die 37 | 1 |
| Die 35 | 3 | Dies 35 and 36 and 37 | 6 |
| Die 36 | 2 | Dies 36 and 35 | 8 |
| Dies 34 and 36 | 7 | Dies 34, 35 and 36 | 10 |

Figure 5A:
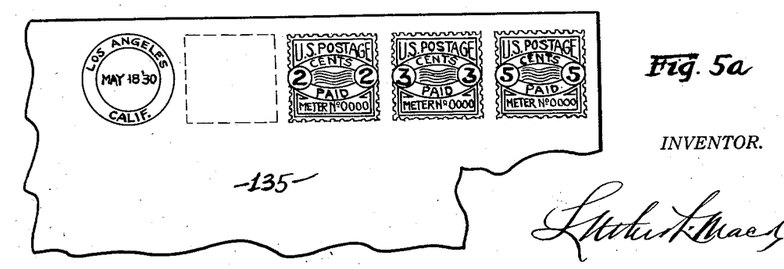
Fig. 5a is a view of an envelope or letter bearing an imprint of stamps of different denominations such as may be made with the mechanism shown and described herein.

Still other odd denominations may be obtained by other combinations of the dies. As shown in Fig. 5a, a different postage impression is imprinted on the letter for each die, and any number of the dies may be combined as stated, or all may be simultaneously operated. When the concentric reduced portion 45 of the cam engages all of the printing dies it is obvious that a zero point in the operation of the machine will be attained, and all of the dies will be retracted inwardly of the cylinder into inoperative position.

It will be observed by reference to Figs. 2 and 5, that the cam 20 has a rim 47 on which the portions 42, 43, 44, 45 and 46 are formed, and each of the printing dies is provided inwardly of its body 39 with an extension 48 which has a slot 49 arranged to receive the rim 47 of the cam. The sides of the slots 49 are arcuately formed, as shown in Fig. 5, and the approaches 50, 50 etc., on opposite sides of the cam portions 42, 43 and 44 are also curved so as to render the adjustment of the cam relative to the dies easy and as nearly frictionless as possible.

The printing cylinder is also provided with a dater 51 having an internal extension 52 which is slidable in a radial slot 53 in the discs 25 and 26, and the printing face 54 of the dater is concentric with the axis of the printing cylinder and flush with the printing circle of the dies. Said dater is removable for the purpose of changing the date type, and to that end is provided with a lug 55 on one side thereof adapted to be engaged by a portion 56 of a latch 57 pivotally held in the cylinder B on a screw 58 against the tension of a spring 59.

The latch 57 may be retracted from engagement with the dater by means of a finger-piece 60. Said dater shows, as indicated in Fig. 5a, the name of the city and State of origin, the month of the year, day of the month, and the year, and the dater is positioned adjacent the die 37, assuming that said die is the last of the series and the die 34 is the first.

The shaft 16 is extended outwardly from the front wall 2 of the housing, and has fixed to it a knob or dial 61 with numerals arranged on the flange 62 thereof to correspond to the possible denominations of stamps which may be imprinted by means of the printing dies on cylinder B.

Figure 1:
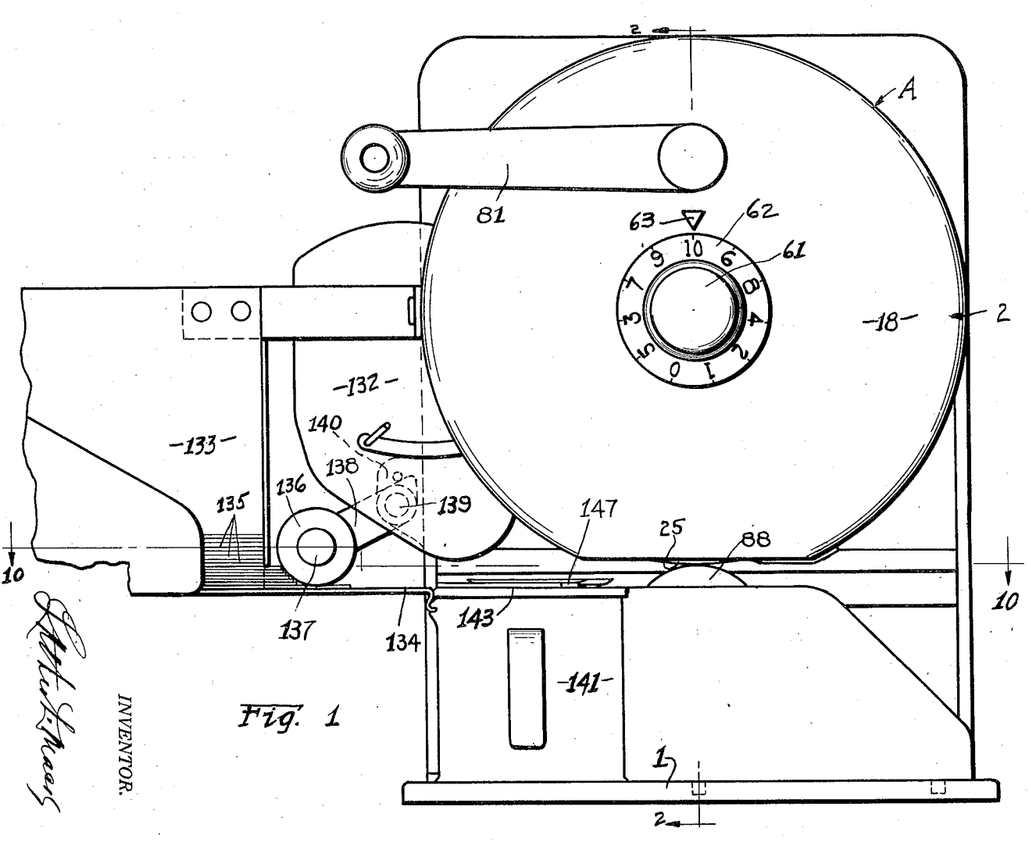
Fig. 1 is a front elevation of the assembled machine.

As shown in Fig. 1, the front wall 18 of the housing carries an indicating lug 63 relative to which the numerals on the dial 61 are adjusted for setting the mechanism to print selected denominations for stamps. The shaft 16 is slidable in the housing and relative to cam 20 against the tension of a compression spring 64 which is carried on the shaft internally of the housing and is compressed between the member 27 and a locking disc 65 fixed to the shaft adjacent the bearing 17. When the knob 61 is depressed the shaft is thrust inwardly against the tension of spring 64 and the counterbore 66 is provided in the bearing 17 for slidably receiving a hub 67 on the knob 61.

Figure 4:
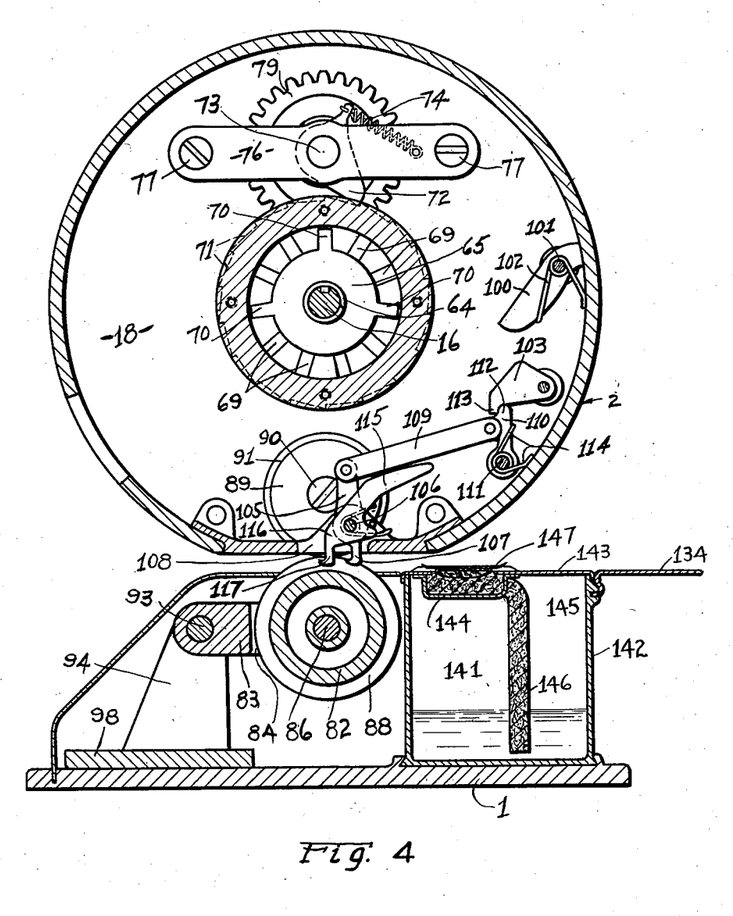
Fig. 4 is a section on line 4—4 of Fig. 2.

The cylinder B has attached to it or formed thereon a circular extension 68 with a plurality of radially formed recesses 69, as shown in Figs. 2 and 4, which are adapted to register with radially extended lugs 70 formed on the locking disc 65. The spring 64, therefore serves to hold the lugs 70 seated in selected notches 69 to correspond to the denominations of stamps to be printed. The portion 68 of the printing cylinder has an initial ratchet 71 formed thereon which is engaged by a pawl 72 pivoted on a counter-shaft 73 and urged into engagement with the ratchet by means of a spring 74, as shown in Fig. 4.

The shaft 73 is journaled in a bearing 75 on a front wall 18 of the housing and also in a plate 76 internally of the housing and secured thereto by means of screws 77, 77. Said shaft 73 has fixed thereto a multiple plate clutch 78 which frictionally engages the gear 79 loosely held on the shaft and which meshes with the gear 80 formed on or attached to the portion 68 of the cylinder B. The outer end of shaft 73 carries an operating handle 81 detachably thereon for rotating the cylinder B during a printing operation.

It will be observed that the pawl 72 thru its engagement with ratchet 71, while permitting the forward rotation of the printing cylinder, prevents the reverse rotation thereof, and the friction clutch 78 connected with the operating handle 81 permits the rotation of the handle without rotating the printing cylinder. The bottom of the portion 2 of the housing is open to permit the operation of the printing cylinder B therethru for contact with the mail matter, and immediately below said cylinder I provide an impression roller 82 which is rotatably mounted on a yoke 83 having arms 84 and 85 spaced apart and carrying a pin 86 on which the roller 82 rotates. Said roller has a pair of friction bands 87 and 88 thereon, the band 88 being arranged for contact with the peripheries of the discs 25 and 26 for gripping and forwarding the mail matter therebetween, and also for bridging the space between said discs so as to hold the mail matter frictionally in contact with the printing dies in a printing operation.

The band 87 cooperates with an idler roller 89 mounted on a pin 90 within the housing portion 2, which may be provided with a frictional band 91 as shown. Preferably the discs 25 and 26 are provided with peripheral grooves 92 in which the free ends of wires 92' are seated above the roller 82, and said wires are suitably attached at their outer ends to the circular wall 2 of the housing, as shown in Fig. 5. Said wires guide the letters outwardly from between the cylinder B and roller 82 and prevent the ends thereof from catching on the edges of the wall 2 adjacent the opening 10' in the housing.

The yoke 83 which carries the impression roller is pivotally mounted at 93 in a bracket 94 attached to base 1 and has a depending arm 95 held in an opening 96 of a sliding bar 97 carried in the base 98 of the bracket 94, and a spring 99 is compressed between the portion 96' of the bar and a portion of the bracket 95 for holding the impression roller in tension at all times for frictional engagement with the mail matter.

Figure 3:
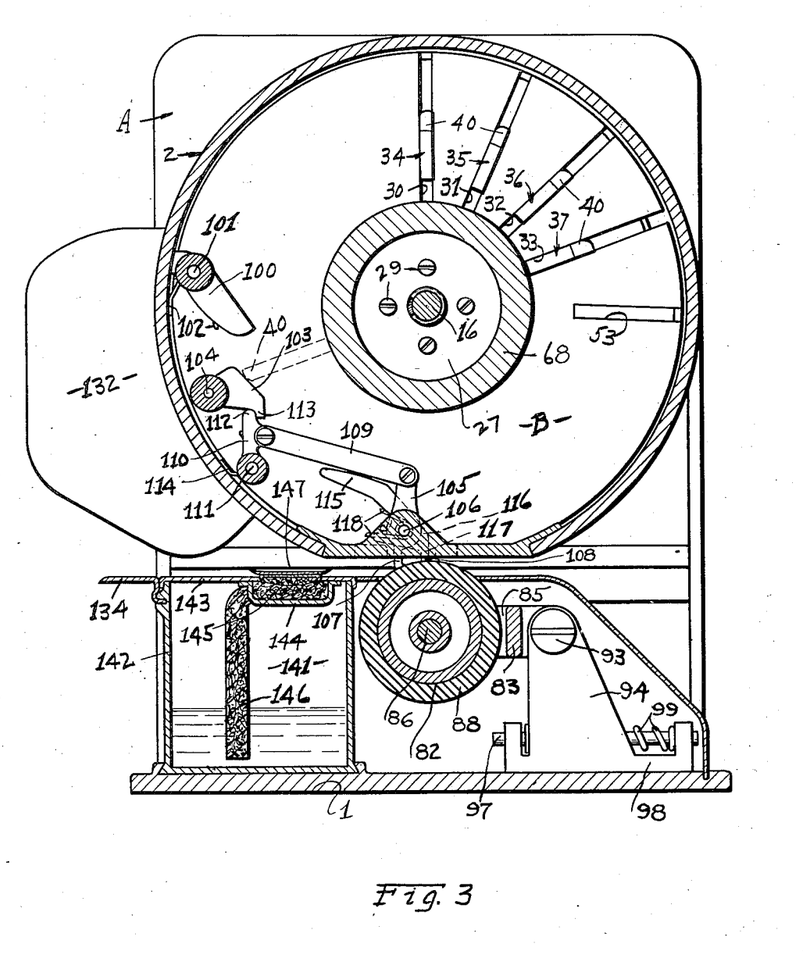
Fig. 3 is a section of the same on line 3—3 of Fig. 2.

Referring to Figs. 3 and 4, the rotation of shaft 16 and cylinder B is clockwise, as shown in Fig. 4, and is counter-clockwise as shown in Fig. 3. The mechanism is arranged to permit but one rotation of the printing cylinder at each printing operation, to support the printing cylinder normally in a fixed position determined by the particular die or dies which are operated, and to stop the operation of and lock the printing cylinder in such normal position at the completion of each printing operation. For instance, if die 34 is to be employed in printing indicia on the mail matter, the mechanism is arranged to stop the rotation of the printing cylinder just prior to the point of inking. In other words, the starting or normal position of the printing cylinder is so adjusted relative to the cam on shaft 16 that the outermost impression would be in the position nearest the forward end of the letter, as shown in Fig. 5a, and the position for impressions which would otherwise be made by dies which are inoperative will be blank, as indicated in the innermost position on the letter in Fig. 5a.

Therefore, in the path of the operative die portions 40 I provide first a yieldable detent 100 which is pivotally held at 101 on the interior of the housing 2 against the tension of spring 102. Thus, as seen in Fig. 3, as the cylinder B is rotated in a counter-clockwise direction, assuming that the first die 34 of the series is operative, the portion 40 will frictionally engage the detent 100 and retard, but not stop, the rotation of the printing cylinder. Slightly further on in its rotation, however, the portion 40 will engage a locking member 103 which is pivotally held at 104 on the interior of the housing and has a beveled surface adapted to frictionally engage the outer edge of the portion 40.

This lock 103 is under the control of mail matter which is fed manually into the machine. This control of the operation of the printing cylinder B is effected through the instrumentality of an actuator 105 which is pivotally mounted at 106 in the bottom of the housing 2 and has a depending extension 107 extended through an opening 108 in the housing into position where the insertion of a piece of mail matter into the grip of cylinder B and roller 82 will move the extension 107 forwardly and the upper portion 105 of the actuator in a counter-clockwise direction.

Said member 105 is connected by means of a link 109 with a dog 110 which is pivoted at 111 in the housing. The dog has an end portion 112 which engages a depending portion 113 on the lock 103 and normally prevents the movement of the lock 103 in a clockwise direction, as seen in Fig. 3. Said dog is yieldably held in operative engagement with the member 103 by means of a spring 114 which serves also to tension the actuator 107. The movement of a letter into the grip of cylinder B and roller 82 will thus retract the dog 110 and permit the yielding of lock 103 so that the members 40 of the printing dies will move by the lock. The continued movement of the printing cylinder in the same direction will engage the member 40 with an arm 115 on an auxiliary member 116 which is commonly pivoted on the pin 106 with the member 105 and has a corresponding extension 117 depending into the path of the mail matter, but adapted to prevent and time the movement of the mail matter into the machine until the arm 115 has been depressed and the portion 117 retracted by means of the member 40 on the first die of the series. Thus member 116 prevents the advance of the letters until the printing die has been rotated to a proper extent and engages arm 115 to retract member 116 from the path of the letters. The normal position of the printing cylinder B is always such that the portion 40 on the first operative die of the series will engage the lock 103 which prevents the rotation of the cylinder except when a piece of mail matter is moved into position between cylinder B and roller 82 preparatory to a printing operation.

The member 116 is yieldable against the tension of a spring 118 which is wound around the pivot pin 106, as shown.

Ink is applied to the printing dies by means of a suitable inking mechanism which may include a bracket 119 attached to one side of a housing 2 and a pair of absorbent rollers 120 and 121. The roller 120 is rotatably mounted on a pin 122 carried in a yoke 123 which is adjustable on a stud 124 extending outwardly from said bracket and is yieldable against the tension of a spring 125. Thus the roller 120 may be adjusted into proper contact with the printing dies 34, 35, 36 and 37, and the dater 51, by means of an adjusting nut 126 on the outer end of the stud 124.

An auxiliary ink roller 121 is rotatably mounted on a pin 128 carried in a swinging bracket 129 which is pivotally held on a pin 130 and the yoke 123, as shown in Fig. 5. Roller 121 is of absorbent material whereby it may be saturated with ink for application to roller 120.

The applicator roller 120 extends through an opening 131 in the wall 2 of the housing, and the entire inking mechanism may be enclosed by means of a suitable sheet metal housing 132. A suitable feed hopper 133 may be provided at one side of the machine and detachably supported on the housing A by suitable means. Said hopper has a bottom plate 134 which preferably has a longitudinal opening therein whereby the pieces of mail matter 135 which rest thereon may be frictionally engaged by the fingers of an operator and the lowermost piece of matter in the stack advanced until its forward edge engages the actuator 107.

In order to prevent more than one piece of matter entering the machine at each operation, a frictional separator of rubber or the like, as at 136, is fixedly held on a pin 137 carried in an arm 138 which is pivoted at 139 on a lug 140 extended outwardly from the housing A, as shown in Fig. 1. The member 136 rests upon the bottom 134 of the feed hopper and engages the pieces of matter 135 so as to prevent all but the lowermost piece from entering the machine in a single operation.

A suitable sealing mechanism may be provided on the base 1 of the housing intermediate the feed hopper 133 and the impression roller 82. Such a mechanism is shown at 141 and includes a receptacle 142 for water, having a detachable top 143 with a shallow transverse extension 144 in which a strip of absorbent material 145 is held, and has an end 146 depending into the water whereby water may be fed to the extension 144 by capillary attraction.

Above the top 143 of the sealing receptacle is provided a yieldable thin metal blade 147 on the bottom of which is an absorbent strip of material 148 which normally seats in an opening in the top 143 so as to contact with the wet strip 145 of material. The blade 147 is so formed that as an envelope enters the machine right side up and with the flap closed, the body of the envelope will move over the top of said blade, while the flap will move under the blade and between the absorbent members 145 and 148. Thus the moisture from the member 148 is applied to the gummed surfaces of the flaps.

The driving shaft 16 of the machine may be slidably and rotatably connected with one or more gears, as at 150 and 151, carried respectively on shafts 152 and 153, which are journaled in the rear frame member 4 for the purpose of operatively connecting the machine with a motor or other source of power. In such case the shaft 152 is connected with the shaft 16 by means of a telescoping coupling 154.

In the rear of the housing A and at the top thereof I provide an ascending registering mechanism R and a descending registering mechanism R', which are typical of each other and are operated to a like extent at each printing operation so as to register on each of said devices the value or values of the stamp impressions made. The ascending register R adds the value of each impression to the accumulated total previously registered thereon, while the descending register R' subtracts the values of the impressions. Therefore, the register R' shows the balance of a prepaid amount of postage impressions which the machine is capable of printing without resetting.

Figures 11, 13, 15:
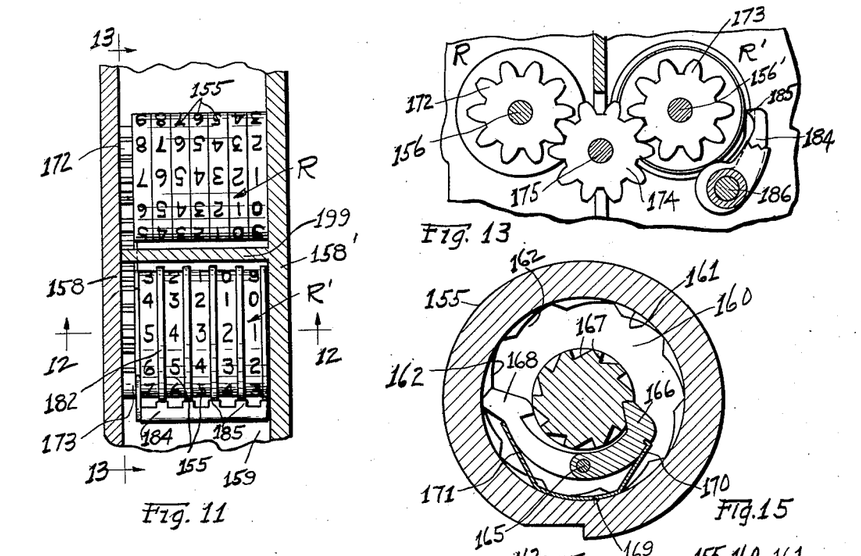
Fig. 11 is a sectional plan of the registering mechanism on line 11—11 of Fig. 7.
Fig. 13 is an end view of the registering mechanism showing the operating and locking means therefor.
Fig. 15 is a transverse section of the same on line 15—15 of Fig. 12.
Figures 12, 14, 16:
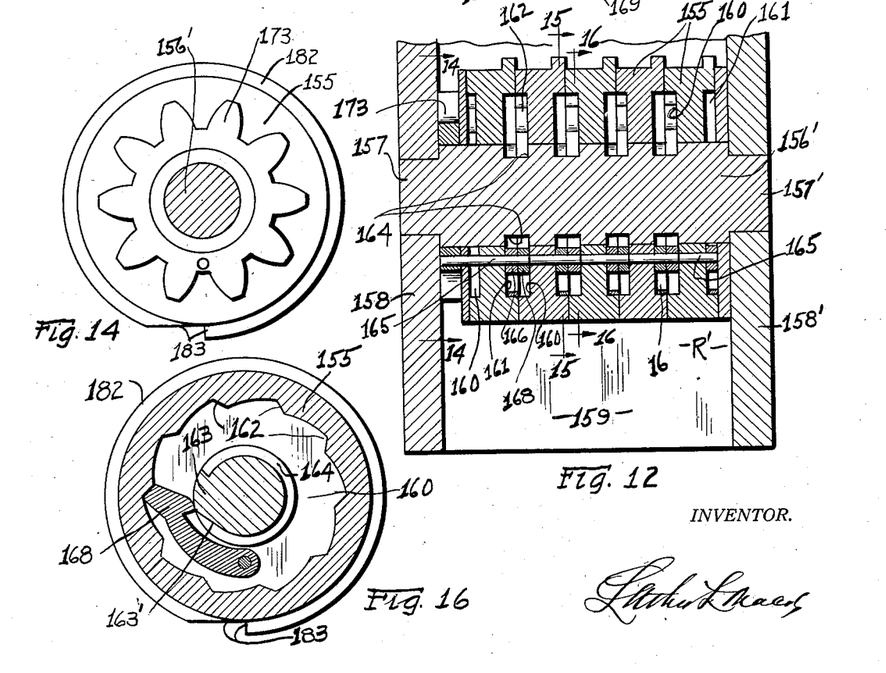
Fig. 12 is a longitudinal section of the descending registering mechanism on line 12—12 of Fig. 11.
Fig. 14 is a transverse section of the descending register on line 14—14 of Fig. 12.
Fig. 16 is a transverse section of the same on line 16—16 of Fig. 12.

Each of the registers includes a plurality of coaxial counting wheels 155, 155 etc., as shown in Figs. 11 to 16 inclusive. Said counting wheels are rotatably mounted on stationary arbors 156 and 156' respectively, which preferably have squared or flattened end portions 157 and 157' for non-rotatably supporting the arbors in spaced walls 158 and 158' of the bracket 159 stationarily held in the housing or formed thereon. Each of the counting wheels 155 has recesses 160 and 161 on opposite sides thereof preferably of uniform depth and diameter so that, as shown in Fig. 12, they will register with each other when the wheels are operatively positioned on their respective arbors.

The inner peripheries of the recesses 160 in each of the wheels 155 is provided with ten internal ratchet teeth 162, 162 etc., which are in the transverse plane of cams 163 formed in peripheral grooves 164 of the arbor. Each of the counting wheels carries a pin 165 on which is held a pawl 166 in its recess 161, which is adapted to engage ratchet teeth 167 for preventing a backward movement of the wheel, and said pin also carries an operating pawl 168 for engagement with the ratchet teeth 162 of the next highest wheel in order. The two pawls 166 and 168 are commonly held in engagement with their ratchets 167 and 162 respectively, by means of a spring 169 held against the arcuate periphery of the recess 161 and having end portions 170 and 171 resting against said pawls respectively.

Each of the counting wheels, as shown in Fig. 11, is numbered with ten digits from "0" to "9" consecutively.

In the operation of the ascending counter, on the movement of the units wheel 155 from "9" to "0", the pawl 166 will engage the corresponding tooth 162 of the tens counter and move said tens counter so as to register "1", and the same operation is repeated at the completion of each revolution of the units counter and the succeeding counters for transverse movement to the counter next highest in order. The cam 163 has an inclined approach 163' which is engaged by the pawl 168 in the movement of the wheel from "8" to "9" in each case so as to elevate the pawl from an inoperative position to an operative position relative to the ratchet 162. In the succeeding movement of the counter from "9" to "10" the pawl 168 is continuously held in engagement with its ratchet by reason of the arcuate and concentric periphery of the cam 163.

At the completion of this last described movement the pawl 168 will drop from the cam 163 into the groove 164 where it will remain disengaged from the ratchet 162 until the completion of another revolution.

The same operation is true of both of the counters R and R', except that the counter R operates in an ascending scale while the counter R' operates in a descending scale.

Figure 6:
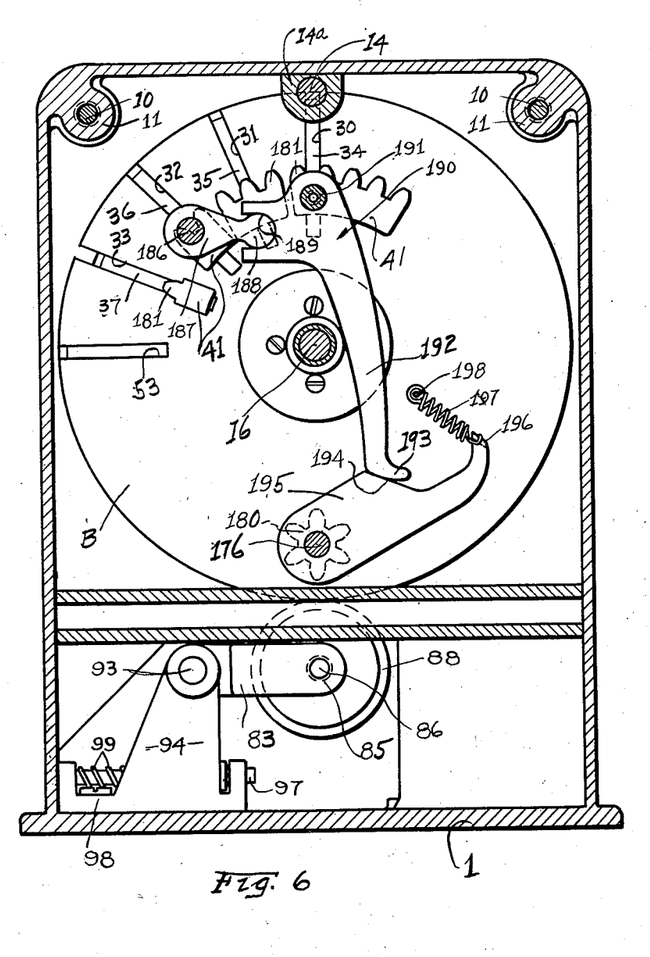
Fig. 6 is a sectional elevation on line 6—6 of Fig. 2.

The units counters of the registers R and R' are provided with gears 172 and 173 respectively, which mesh with a common gear 174 carried on the pin 175, and the gear 174 is connected with a register operating shaft 176 by means of a gear train including gears 177, 178 and 179 mounted on the wall 7 of member 3. The gear 177 is coaxial with the shaft 16 and is loosely mounted on the bushing 177' while the gear 178 is held on a pin 178'. The operating shaft 176 is journaled in the members 3 and 4 and extends forwardly of the member 3 and carries a pinion 180 fixed thereto and disposed in the path of gear teeth 181 which are externally formed on the extended portions 41 of each of the printing dies 34, 35, 36 and 37 when said dies are operative. The size and ratio of the several gears connecting the printing dies with the registers R and R' are such that the operating pinion 180 will be rotated one tooth for each one cent of value of every impression made by the printing dies. Thus, as illustrated in Fig. 6, if the die 37 is arranged to imprint a one cent indicia it will be provided with one of the teeth 181, the die 36 would be provided with two teeth, the die 35 with three teeth, and the die 34 with five teeth, for imprinting 1¢, 2¢, 3¢ and 5¢ indicia respectively.

When the dies are retracted to inoperative position the teeth 181 will clear the teeth of the operating pinion 180, but when said dies are extended to operative position the pitch line of the teeth 181 will be tangent to the pitch circle of the gear 180.

The register R' slightly differs from the register R in that each of the counting wheels 155 is provided with an annular flange 182, and the flanges on the several of these wheels have notches 183 formed therein, which are correspondingly positioned relative to like numerals on the faces of said wheel. Said notches are so positioned that when the wheels register "0" on a common line parallel to the axis of their arbor, the notches will be longitudinally alined and will be engaged by a locking bar 184 which has a tooth 185 engaging each of the flanges 182.

The bar 184 is pivotally mounted on the pin 186 journaled in the walls 158 and 159', and said pin carries on its forward end an arm 187 which has a rounded head 188 seated in a notch 189 in a lever 190. Said lever is pivotally mounted on a pin 191 and is provided with a downwardly extending arm 192 which has a foot 193 at its lower end adapted to engage an inclined edge 194 of an arm 195 which is pivotally held on the operating shaft 176 rearwardly of pinion 180. The arm 195 has a right angularly bent end portion 196 to which one end of a spring 197 is connected, while the other end of said spring is attached to a pin 198 in the wall 7 of member 3. When the extended portion 196 of member 195 is held out of the path of the portions 41 of the printing dies against the tension of spring 197, the locking bar 184 is held outwardly on the periphery or peripheries of one or more of the flanges 182 of the counting wheel, thus normally preventing the locking of the registers R and R' against operation. When the notches 183, however, are alined with the teeth it is obvious that the bar will move inwardly, due to the tension of spring 197 and the connections between bar 184 and lever 190.

The movement of the bar inwardly, as shown in Fig. 13, into the notches 183 will move the arm 187 in a clockwise direction as seen in Fig. 6, thus causing the movement of lever 190 in a counterclockwise direction and permitting the movement of the inclined edge 194 over the foot 193 under the influence of spring 197 until the extended portion 196 of arm 195 is disposed in the path of the members 41 of the operative dies.

The units and tens wheels of each of the series indicate cents, while the remaining wheels of each series indicate dollars, and in order to provide a sufficient range to accommodate the imprinting of stamps of larger denomination than those shown and prior to the locking of the registers against further operation I may omit the teeth 185 from the locking bar 184 from positions of registration with the units and tens counting wheels. The locking of the registers is accomplished only at the completion of a printing operation, and therefore if a stamp of any denomination less than $1.00 is to be imprinted such operation may be completed, although the dollar counting wheels will be locked against further operation.

Figures 7, 8, 9:
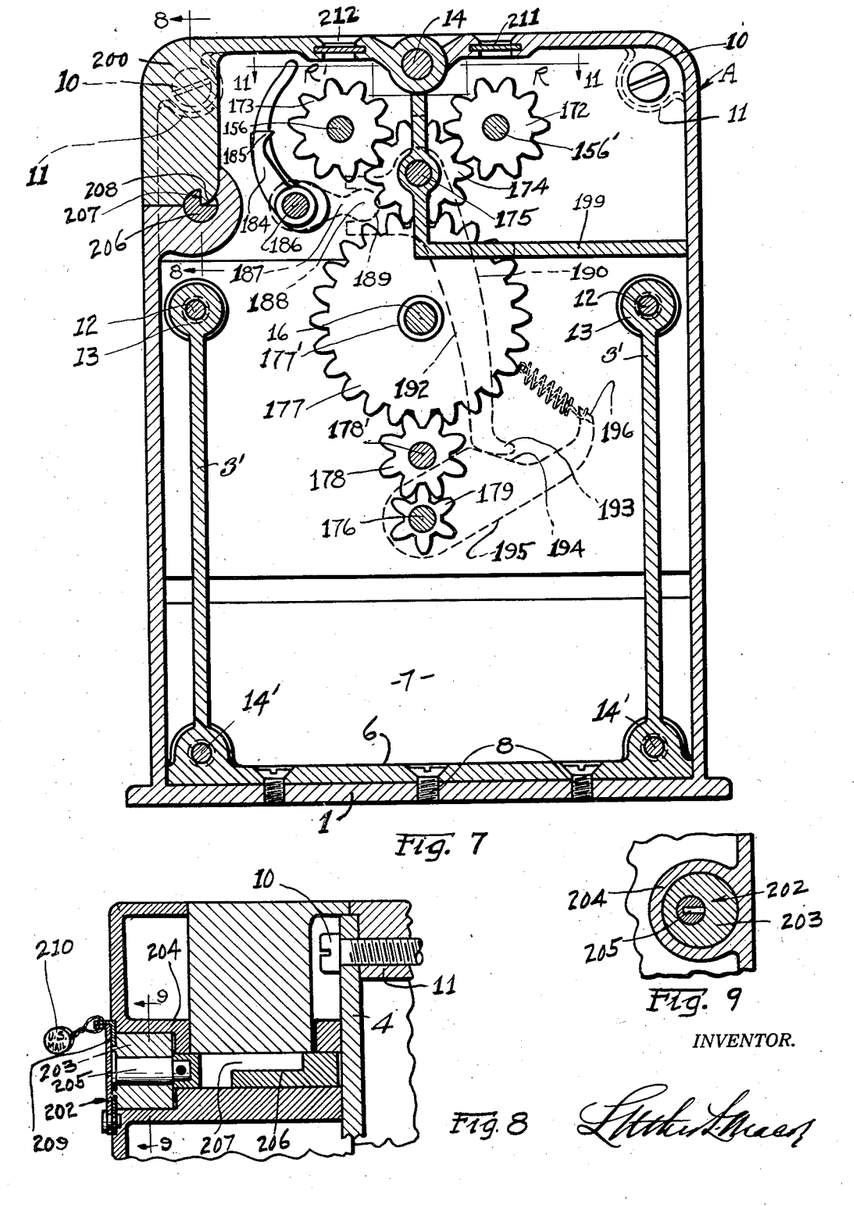
Fig. 7 is a section on line 7—7 of Fig. 2.
Fig. 8 is a vertical section of the locking means on line 8—8 of Fig. 7.
Fig. 9 is a fragmentary section of the lock on line 9—9 of Fig. 8.
Figure 10:
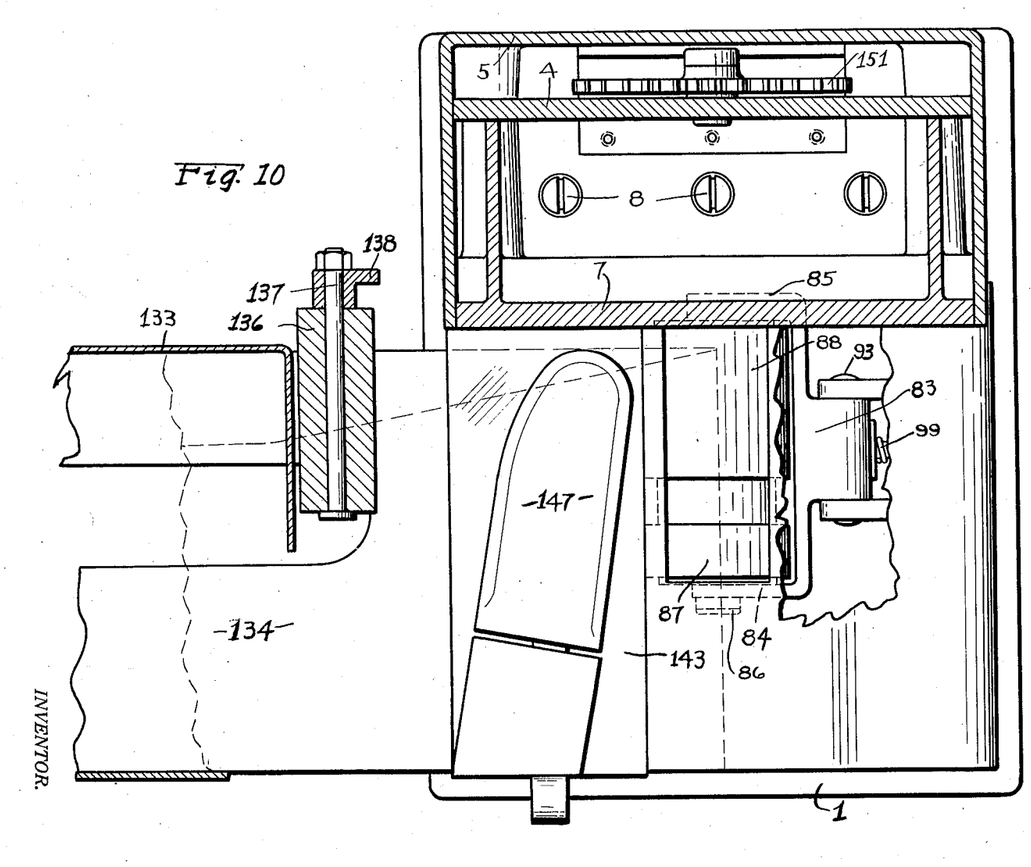
Fig. 10 is a sectional plan on line 10—10 of Fig. 1.

As shown in Fig. 7, the ascending register R is preferably enclosed within a partition 199 in the housing against access, while access is afforded to the descending register R' by means of a door 200 which is pivotally held on a hinge pin 14 and is adapted to be locked by means of a suitable cylinder lock 202 having a barrel 203 held in a boss 204 in the door and a key operated cylinder 205 alined and connected with a rotating bolt 206. Said bolt is cut away at 207 to receive a lug 208 formed on the door, as shown in Fig. 7, so that when the bolt and cylinder are turned to a predetermined position the door will be closed against access.

It is desirable to provide a hinged escutcheon 209 over the lock 202, which may be sealed by means of a lead seal 210 by postal authorities to prevent access to the lock without detection.

The top of the housing A is provided with a glass covered aperture 211 over the register R, while the door 200 is provided with a similar glass covered aperture 212 over the register R' so that the numerals on the registers may be readily read thru the top of the housing.

Figure 17:
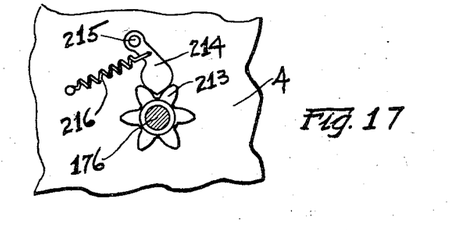
Fig. 17 is a fragmentary vertical section on line 17—17 of Fig. 2.

Adjacent the rear frame member 4 of the housing I provide a ratchet or star wheel 213 fixed to the register operating shaft 176 which has teeth therein corresponding to the number of teeth in the operating pinion 180. Said ratchet is yieldably engaged by a detent 214 which is pivoted at 215 to the member 4 and is held in engagement with the ratchet 213 by means of a tension spring 216. This device is shown in Figs. 2 and 17. The purpose of the detent 214 and ratchet 213 is to properly center the teeth in the pinion 180 for operative engagement with the teeth 181 on the printing dies and to prevent an over-operation or under-operation of the shaft 176.

The housing 2 may be provided with an aperture 217 at a suitable point, thru which the dater 51 may be removed for the purpose of changing the type therein.

In the use of the device it will be understood that the meter is set with both of the registers R and R' at "0". The meter is then unlocked and unsealed by the postmaster and the descending register R' set so as to register the amount of postage paid by the user as viewed thru the aperture 212, whereupon the lock 203 is operated for locking the door 208 against unauthorized access and the seal 210 is placed in position on the escutcheon plate 209.

Preferably the mail matter is associated into different denominations, and the dial 61 is set relative to the indicating lug 63 for the successive denominations. The mail matter of a single denomination is placed in the feed receptacle 133, the dial 61 being set to that particular denomination, and the lowest piece of matter in the stack 135 is advanced inwardly over the sealer 141 to a position between the impression roller 82 and the printing cylinder B. The thrust of the front end of the letter against the actuator 107 retracts the stop member 103 from engagement with the portion 40 of the first printing die of the series, thereby permitting the rotation of the printing cylinder in a counter-clockwise direction, as seen in Fig. 3.

The piece of matter will remain stationary in such position until the member 40 engages the member 115 and retracts the member 117 from the path of the matter. When the member 117 is retracted the discs 25 and 26 of the printing cylinder cooperate with the friction band 88 of impression roller 82 to grip and advance the letter thru the machine so as to imprint the indicia thereon corresponding to the postage indicated by the setting die.

The normal position of the printing cylinder is such that the first of the operative printing dies will be positioned just slightly in advance of the inking roller 120 so that the dies will contact successively with said inking roller for applying a film of ink on the die.

When the operative printing dies assume a position adjacent the impression roller 82 the sectors 181 on the extensions 41 from said dies will operatively engage and rotate the pinion 180 to correspond to the total value of postage printed in cents, and motion is communicated from the pinion 180 thru the gears 179, 178, 177 and 174 successively to the gears 172 and 173 of the registers R and R' respectively. Thus if, as shown in Fig. 5a, the 5¢, 3¢ and 2¢ dies are operative, the 5¢, 3¢ and 2¢ impressions will be made on the letter 135 and the registers will be operated successively five, three and two points for registering a total of 10¢ on the register, which is the sum of the 5¢, 3¢ and 2¢ impressions.

The ascending register R will accumulate or add the values imprinted upon the registers, while the descending register R' will subtract the corresponding values from the total amount thereon. When the printing cylinder B has been rotated for one complete revolution, the several operating parts will be restored to normal, and the member 40 of the first of the operating printing dies will re-engage the stop member 103 and prevent the further rotation of the printing cylinder until another letter has been advanced into the grip of the printing cylinder and the impression roller and the printing cylinder released for a succeeding operation. The backward movement of the printing cylinder is prevented by the engagement of pawl 72 with the ratchet 71.

Preferably the first of the series of printing dies, as at 34, bears the indicia of highest denomination, while the succeeding printing dies 35, 36 and 37 are graduated downwardly in value. Therefore, assuming that the die 34 is for imprinting a 5¢ stamp, the normal position of the printing cylinder B will be determined by the engagement 40 of the die 34 with the stop member 103. Assuming that the die 34 was of 5¢ denomination, the die 36 of 3¢, and the die 37 of 2¢, 10¢ postage indicia may be imprinted on the letter, as shown in Fig. 5a, by rendering the dies 34, 35 and 36 simultaneously operative, while the die 37 would be inoperative. The position of the stamp on the letter corresponding to the position of the die 37 would be vacant. If a 7¢ stamp were to be printed, the 3¢ stamp would be omitted between the 2¢ and 5¢ impressions on the letter. If a 2¢ impression were to be imprinted on the letter, all of the remaining dies would be inoperative and the normal position of the printing cylinder would be such that the 2¢ impression would be imprinted in the position occupied by the 5¢ stamp in Fig. 5a.

Thus the normal position of printing cylinder B is variable to correspond to the postage indicia printed. It will, therefore, be apparent that impressions of any one of the several denominations or combinations of two or more of said denominations may be imprinted upon a single piece of matter by setting the dial 61 for the total value of the impressions in each case.

A particular feature of this machine resides in the fact that the printing of successive stamps on a single letter may be effected without resetting the dial or shifting the printing cylinder, and the registers R and R' cannot be operated except by and when the printing dies are moved by printing position. The frictional connection of the handle 81 with the printing cylinder B permits the continuous rotation of the handle without rotating the printing cylinder except when and as successive pieces of matter are moved into the grip of the printing cylinder and impression roller, thereby safeguarding the postage in the meter against accidental loss.

What I claim is:

1. A postage meter comprising a housing locked against unauthorized access, a printing member and a cooperating impression member mounted on said housing, a plurality of printing dies of different denominations carried by said printing member, and means for rendering certain of said printing dies operative and for locking certain other dies in inoperative position for imprinting authorized indicia upon mail matter in a single operation of said printing member.

2. A postage meter comprising a housing locked against unauthorized access, a printing member mounted therein for rotation in a given direction and prevented from rotation in a reverse direction, an impression member cooperating therewith, a plurality of printing dies of different denominations extensibly mounted at different peripheral positions on the printing member, and means for selectively extending said dies to and from operative position to correspond to the value of postage impressions to be imprinted and for locking the inoperative dies against operation.

3. A postage meter comprising a housing locked against unauthorized access, a rotatable printing member therein having a plurality of printing dies of different denominations extensibly mounted thereon at different peripheral positions for selective movement to and from a common arcuate plane concentric with the axis of the printing member, and a manually operable member interlocked with said dies for positively extending and retracting said dies and thereby rendering a given number of said printing dies simultaneously operative preparatory to a postage printing operation.

4. A postage meter comprising a housing locked against unauthorized access, a rotatable printing member mounted therein having a plurality of printing dies of different denominations arranged at successive positions on the periphery of said printing member and selectively extensible to and from a common arc for successively printing a plurality of postage impressions of different values on mail matter, means associated with the printing member for forwarding mail matter through the meter during a printing operation, and means associated with the printing member for locking the inoperative dies against operation, said locking means being positively interlocked with said printing dies.

5. A postage meter as characterized in claim 4, including means permitting the rotation of said printing member for one complete revolution in each operation and for preventing the backward movement thereof.

6. A postage meter as characterized in claim 4, including means permitting the rotation of said printing member for one complete revolution in each operation and for preventing the backward movement thereof, and means for releasing the printing member for operation when a piece of mail matter is positioned adjacent the printing member preparatory to a printing operation.

7. A postage meter as characterized in claim 4, including means permitting the rotation of said printing member for one complete revolution in each operation and for preventing the backward movement thereof, and means controlled by the movement of a piece of mail matter to printing position for releasing the printing member for a printing operation.

8. A postage meter as characterized in claim 4, including means permitting the rotation of said printing member for one complete revolution in each operation and for preventing the backward movement thereof, means controlled by the movement of a piece of mail matter to printing position for releasing the printing member for a printing operation, means preventing the movement of the mail matter with the rotation of the printing member for a predetermined interval of time, and means for releasing the mail matter for movement with the printing cylinder at a predetermined point in the rotation of said printing member.

9. A postage meter comprising a housing locked against unauthorized access, a rotatable printing member mounted therein having a plurality of printing dies of different denominations positioned at different peripheral points thereon and selectively extensible to and from a common arc for successively printing a plurality of postage impressions of different values on mail matter, a cam interlocked with said printing dies for positively extending and retracting the same, means associated with the printing member for forwarding mail matter through the meter during a printing operation, an operating member frictionally connected with said printing member and arranged for continuous operation, and means preventing the rotation of the printing member except when mail matter is operatively positioned preparatory to a printing operation.

10. A postage meter as characterized in claim 9, including means controlled by the movement of the mail matter to printing position for releasing the printing member for a printing operation.

11. A postage meter as characterized in claim 9, including means controlled by the movement of the mail matter to printing position for releasing the printing member for a printing operation, and means controlled by the rotation of the printing member for preventing the movement of the mail matter until the printing member has been rotated to a predetermined extent.

12. In a postage meter, the combination with a printing member and a cooperating impression member arranged to receive mail matter therebetween in a printing operation, of means for operating said printing member, and a plurality of printing dies adjustably mounted at successive peripheral positions on the printing member for movement into a common plane whereby a plurality of said dies may be simultaneously operative for printing impressions of different denominations on mail matter in a single operation of the printing member, and means for locking the operative and inoperative dies in their respective positions, said locking means including a cam interlocked with said printing dies and having a plurality of peripheral portions engaging said dies for holding selected dies extended and retracted.

13. In a postage meter, the combination of a housing locked against unauthorized access, a rotatable printing cylinder mounted therein, a plurality of printing dies mounted at successive peripheral positions and radially adjustable on said printing member, and means associated with said printing member for moving said dies to and from a common printing arc and for locking the same in selected positions whereby said printing member is effective for printing a plurality of postage impressions of different values on mail matter in a single operation, and means permitting the rotation of said printing member for a given direction and preventing the rotation thereof in a reverse direction.

14. In a postage meter, the combination of a housing locked against unauthorized access, a rotatable printing cylinder mounted therein, a plurality of printing dies mounted at successive peripheral positions and radially adjustable on said printing member, and means associated with said printing member for moving said dies to and from a common printing arc and for locking the same in selected positions whereby said printing member is effective for printing a plurality of postage impressions of different values on mail matter in a single operation, and means permitting the rotation of said printing member for a given direction and preventing the rotation thereof in a reverse direction, and means controlled by the operative printing dies for stopping the operation of the printing member at the completion of each revolution thereof.

15. In a postage meter, the combination of a housing locked against unauthorized access, a rotatable printing cylinder mounted therein, a plurality of printing dies mounted at successive peripheral positions and radially adjustable on said printing member, and means associated with said printing member for moving said dies to and from a common printing arc and for locking the same in selected positions whereby said printing member is effective for printing a plurality of postage impressions of different values on mail matter in a single operation, and means permitting the rotation of said printing member for a given direction and preventing the rotation thereof in a reverse direction, means controlled by the operative printing dies for stopping the operation of the printing member at the completion of each revolution thereof, and means controlled by the movement of mail matter to printing position for releasing said printing member for a printing operation.

16. In a postage meter, the combination of a housing locked against unauthorized access, a rotatable printing cylinder mounted therein, a plurality of printing dies mounted at successive peripheral positions and radially adjustable on said printing member, and means associated with said printing member for moving said dies to and from a common printing arc and for locking the same in selected positions whereby said printing member is effective for printing a plurality of postage impressions of different values on mail matter in a single operation, and mean permitting the rotation of said printing member for a given direction and preventing the rotation thereof in a reverse direction, means controlled by the operative printing dies for stopping the operation of the printing member at the completion of each revolution thereof, means controlled by the movement of mail matter to printing position for releasing said printing member for a printing operation, and means controlled by the initial rotation of the printing member for preventing the movement of the mail matter with the printing member until the printing member is rotated to a predetermined extent.

LUTHER L. MACK.